(12) United States Patent
Shin et al.

(10) Patent No.: US 8,967,457 B2
(45) Date of Patent: Mar. 3, 2015

(54) TOTAL HISTORY MANAGEMENT SYSTEM AND METHOD USING RADIO FREQUENCY IDENTIFICATION (RFID) TAG AND BARCODE

(75) Inventors: Dong Beom Shin, Daejeon (KR); Heyung Sub Lee, Daejeon (KR); Sang Hyun Mo, Daejeon (KR); Kang Bok Lee, Daejeon (KR); Jae Heum Lee, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 95 days.

(21) Appl. No.: 13/596,824

(22) Filed: Aug. 28, 2012

(65) Prior Publication Data

US 2013/0087610 A1    Apr. 11, 2013

(30) Foreign Application Priority Data

Oct. 7, 2011    (KR) .......................... 10-2011-0102314

(51) Int. Cl.
  *G06F 17/00*    (2006.01)
  *G06Q 10/08*    (2012.01)
(52) U.S. Cl.
  CPC ....................................... *G06Q 10/08* (2013.01)
  USPC ........................ 235/375; 235/383; 235/462.09
(58) Field of Classification Search
  CPC .......... G06K 17/0022; G06K 17/0025; G06K 7/10861
  USPC ........... 235/375, 462.01, 462.09–10, 462.46, 235/472.02
  See application file for complete search history.

(56) References Cited

U.S. PATENT DOCUMENTS

| | | | |
|---|---|---|---|
| 5,963,134 A | 10/1999 | Bowers et al. | |
| 6,249,227 B1 * | 6/2001 | Brady et al. | 340/572.1 |
| 6,415,978 B1 * | 7/2002 | McAllister | 235/462.01 |
| 7,009,517 B2 * | 3/2006 | Wood | 340/572.1 |
| 7,035,856 B1 * | 4/2006 | Morimoto | 705/7.12 |
| 8,256,381 B2 * | 9/2012 | Pratt | 119/174 |
| 8,594,978 B2 * | 11/2013 | Kadaba | 702/184 |
| 2004/0236191 A1 * | 11/2004 | Poliska et al. | 600/300 |
| 2008/0294488 A1 * | 11/2008 | Gupta et al. | 705/8 |

FOREIGN PATENT DOCUMENTS

| | | |
|---|---|---|
| JP | 2009-087305 A | 4/2009 |
| KR | 10-2010-0051156 A | 5/2010 |

\* cited by examiner

*Primary Examiner* — Daniel St Cyr
(74) *Attorney, Agent, or Firm* — Rabin & Berdo, P.C.

(57) ABSTRACT

A total history management system using a radio frequency identification (RFID) tag and a barcode. The system includes an RFID tag, a barcode recorder and a barcode reader. The RFID tag is attached to a box containing a plurality of individual products to store an environmental history of a distribution. The barcode recorder is configured to provide, to each of the plurality of individual products, a barcode in which identification (ID) information of the RFID tag is recorded. The barcode reader is configured to recognize the barcode attached to each of the plurality of individual products, and to output the environmental history of the distribution, corresponding to the ID information of the RFID tag that is received in response to a query with respect to the RFID tag, using the recognized barcode.

8 Claims, 7 Drawing Sheets

TOTAL HISTORY MANAGEMENT SYSTEM AND METHOD USING RADIO FREQUENCY IDENTIFICATION (RFID) TAG AND BARCODE

CROSS-REFERENCE TO RELATED APPLICATION

This application claims the benefit of Korean Patent Application No. 10-2011-0102314, filed on Oct. 7, 2011, in the Korean Intellectual Property Office, the disclosure of which is incorporated herein by reference.

BACKGROUND

1. Field of the Invention

The present invention relates to a total history management system and method using a radio frequency identification (RFID) tag and a barcode, which may efficiently manage individual products using a barcode and an RFID tag that may provide environmental information for management of the individual products.

2. Description of the Related Art

Recently, foreign agricultural products or livestock products which may be harmful to humans have been imported and distributed in great quantities. Accordingly, there is an increasing demand for food safety for consumers in the general public. In addition, a generic technology has been demanded for preventing loss of business through product quality management and minimizing loss of a social cost for the general public, resulting from deterioration of products. The foregoing issues may be resolved by optimizing a process for environmental data management of products in semiconductor industries, medical medicine industries, food industries, and the like in which maintaining constant temperature and humidity is important. In this regard, a technology for verifying product information using a barcode, radio frequency identification (RFID) technology, and the like, and managing a total history from production to distribution and consumption has been developed. The barcode was invented to increase efficiency of product management in supermarkets. The invention of the barcode enables an amount of time spent waiting at a check-out counter to be reduced and enables automatic updating of stock records simultaneously with a product being sold. Accordingly, a scheme of tracing and managing stocks in a sales business has been wholly changed. Prior to the introduction of the barcode, distributors experienced difficulty in verifying a number of sold products, and a number of products to be produced or stored. However, such issues have been resolved through use of the barcode. A barcode may be configured by combining letters or numbers, using black and white symbols that are provided in a shape of a bar. A general barcode may have a capacity in the range of only tens of words, for example, 1 to 100 bytes. Accordingly, the barcode may store only a relatively small quantity of information, for example, a country of origin, a manufacturer, a product item, and the like. That is, the barcode may not store a variety of information, in addition to basic information of a product. In addition, dissimilar to RFID technology, the barcode may have a constraint in that barcodes are to be scanned individually by performing the scanning within a relatively short distance to secure a contact or a visibility. However, since a cost of a barcode may be extremely cheap, barcodes may be attached to each individual product. Accordingly, barcodes may be used to indicate a type of a product using a universal product code (UPS) or may be used for a point of sales system (POS) in a supermarket.

Figure 1:
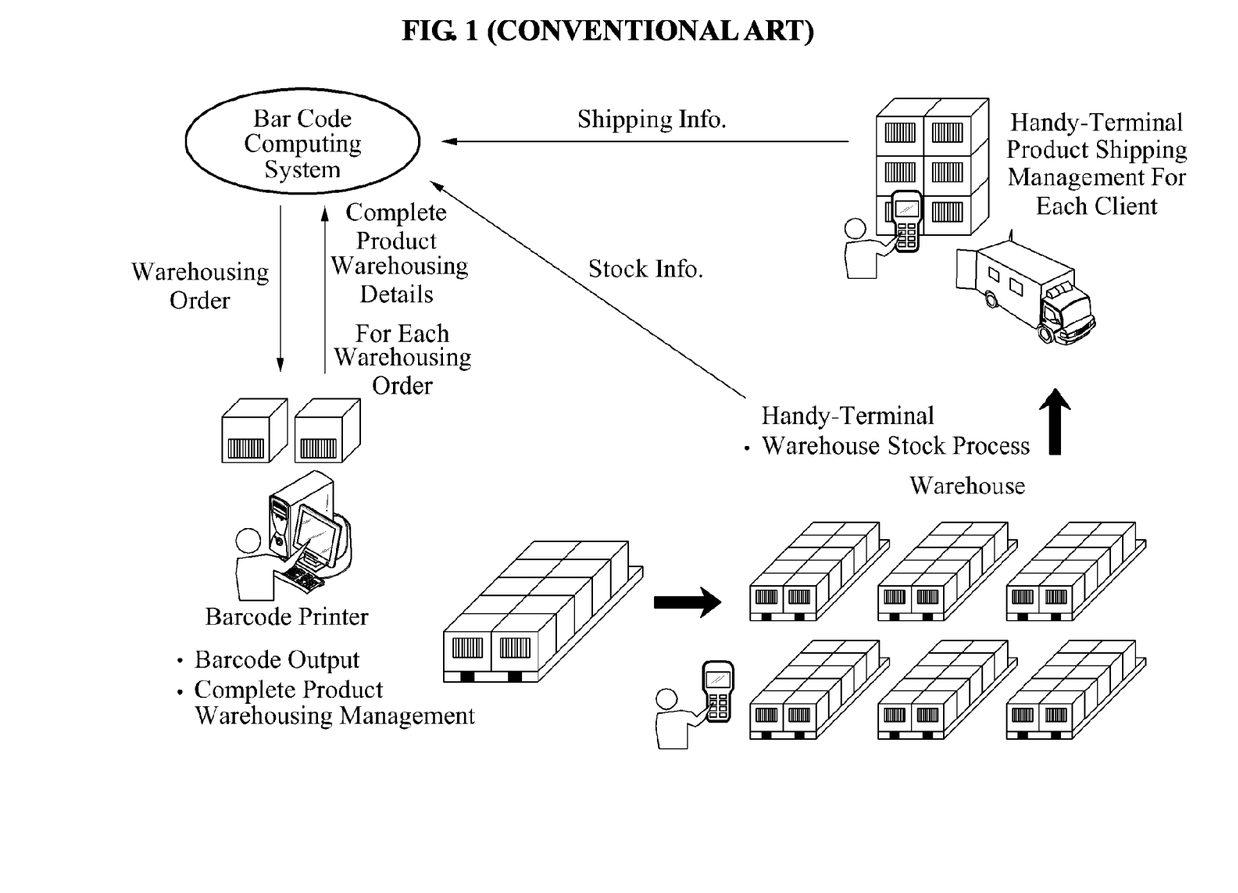
FIG. 1 is a diagram illustrating a system for managing product warehousing, shipping, and stocks according to a conventional art.

FIG. 1 is a diagram illustrating a system for managing product warehousing, shipping, and stocks according to a conventional art.

That is, FIG. 1 illustrates an example of managing warehousing, shipping, and stocks using a barcode. When a warehousing order of complete products is received, a barcode printed using a barcode printer may be attached to every individual product to manage the warehoused complete products. In a warehouse, stocks may be verified by recognizing the barcode using a handheld scanner, and corresponding information may be provided to a computing system. When a shipping order is received for the products, every individual product to be shipped may be recognized using the handheld scanner and information about shipping details may be transferred to the computing system. In this instance, due to an extremely cheap cost, a barcode may be attached to every individual product to manage warehousing, shipping, stocks, and product information. However, the use of the barcode may have constraints on a distance for recognition, recognition of a plurality of products, provision of data about environmental information, for example, temperature, and humidity, and the like, during history management. An RFID tag may refer to a technology for storing information about a product or an object in an electrical tag, and recognizing the stored information using a radio wave. A barcode may be used read information by contacting a reader to every product, whereas the RFID tag may be recognized over a relatively long distance when compared to the barcode, and may recognize information of multiple products simultaneously since the RFID tag may transmit and receive signals wirelessly. Accordingly, the RFID tag may have advantages of a high recognition rate, a connection to other communication networks, and the like. In addition, since the RFID tag may have a capacity of up to tens of kilobytes (Kbyte), the RFID tag may contain basic information of a product, and a variety of information of the product, for example, a country of origin, a travel route, environmental information during a distribution, such as temperature, humidity, and the like, a current state, a purchase history, and the like. Accordingly, the RFID technology is emerging as a new solution for in and out control, logistics, history management, and the like, in lieu of the conventional barcode.

Figure 2:
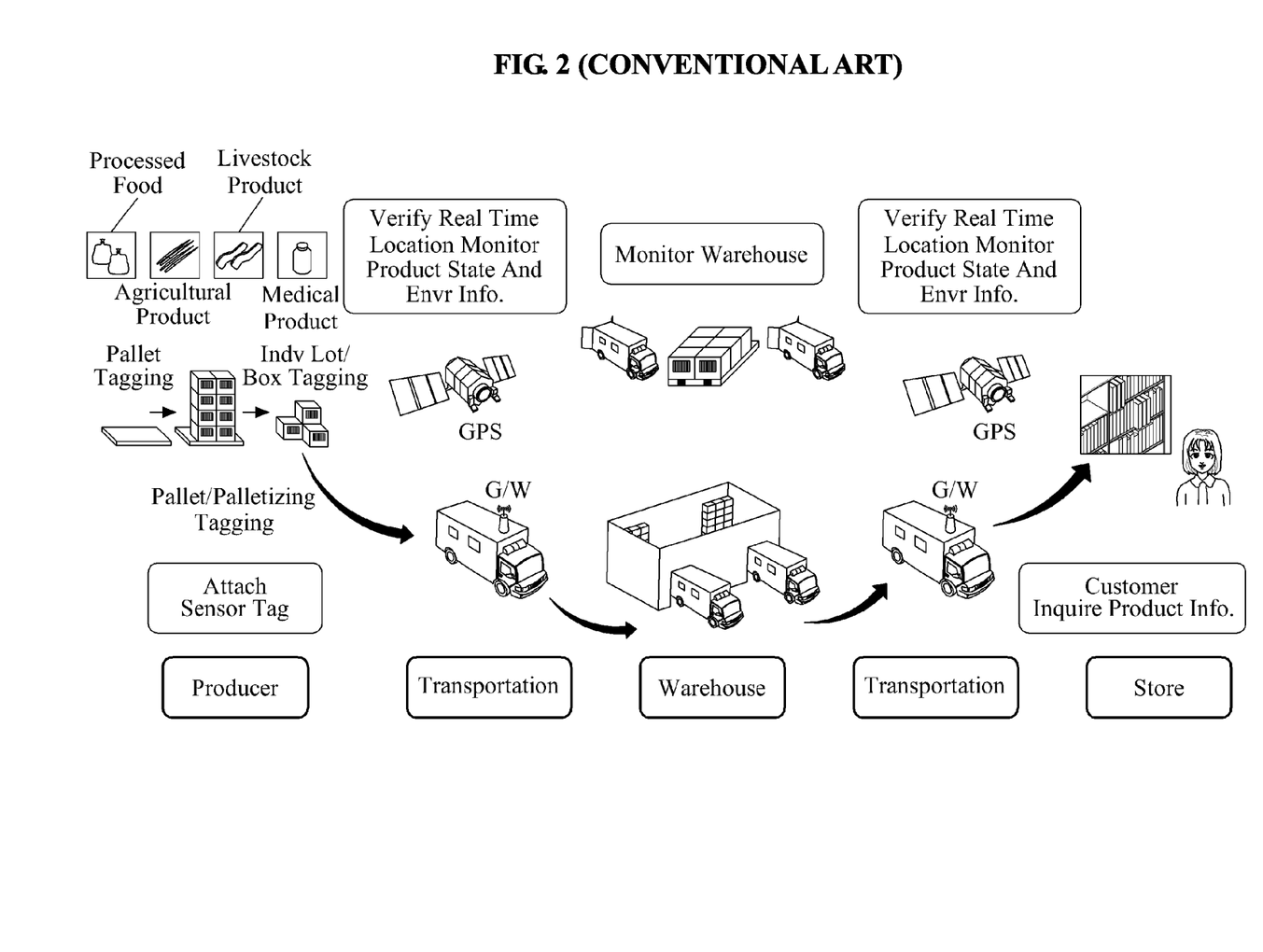
FIG. 2 is a diagram to describe a history management method using radio frequency identification (RFID) according to a conventional art.

FIG. 2 is a diagram to describe a history management method using radio frequency identification (RFID) technology according to a conventional art.

That is, FIG. 2 illustrates an example of product history management using an RFID tag. In a producing area, an RFID tag may be attached to agricultural products, livestock products, and the like. Generally, since a sensor tag for collecting environmental information may be relatively expensive, when compared to a barcode, tagging may be performed in pallet units, except for expensive individual products. A tag attached to a transport vehicle may be connected to a global positioning system (GPS) to provide positional information, and to sense and provide environmental information, for example, temperature and humidity of the vehicle, periodically. In a warehouse, product warehousing and shipping may be managed by reading the RFID tag, and a customer or a final wholesale dealer may verify information and history of a product by reviewing product information. When an RFID tag is used, environmental information may be monitored in real time and a plurality of products may be recognized simultaneously. In addition, since the RFID tag may provide a greater amount of information than a barcode, history management using the RFID tag may be relatively easy when compared to history management using the barcode. However, a spread of an RFID may be difficult due to a high cost of the RFID tag, and a high initial cost of establish an RFID system. Although the RFID technology is used in a greater number of various fields, a barcode system takes a great portion of a product recognition system. Accordingly, a technology on an RFID reader which may be used conjunctively with a barcode system is being developed.

As an example of the foregoing technology, a method of converting tag information to a barcode, and applying the barcode will be described with reference to FIG. 3.

Figure 3:
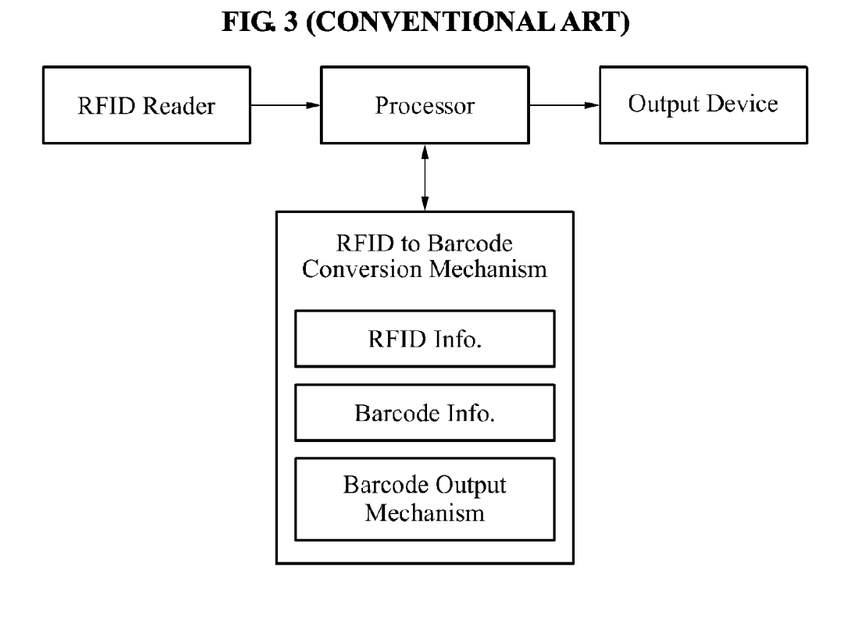
FIG. 3 is a block diagram illustrating a configuration of an apparatus for converting RFID tag information to a barcode, and outputting the barcode according to a conventional art.

Referring to FIG. 3, an RFID reader may receive tag information that is transmitted from an RFID tag. A processor may convert the received tag information to barcode information. An output device may output a barcode. In this instance, although an RFID system and a barcode system may be used conjunctively, a cost of applying an RFID tag for each individual product may increase.

With respect to tracing of a product history, the RFID technology has been developed to mange a history of an individual product. However, in a real application, a tag may be more expensive than a barcode being applied as a conventional recognition technology, and may be inefficient in an aspect of cost cutting in manpower, and the like, due to an issue of a recognition rate. Accordingly, the RFID technology may not be applied to an individual product. A barcode used for product recognition may simply provide limited information, for example, a price of the product, a date of manufacture, and the like, due to a limited capacity of the barcode.

SUMMARY

An aspect of the present invention provides a total history management system and method using a radio frequency identification (RFID) tag and a barcode, which may manage an individual product using RFID history information at a low cost, by combining the RFID information with barcode information, rather than applying, to individual products, an RFID technology for managing a history of the whole process from manufacture to distribution, due to issues about a cost of the RFID tag, a change of equipment in a conventional point of sale (POS) system, a tag recognition rate, and the like.

According to an aspect of the present invention, there is provided a total history management system using an RFID tag and a barcode, the system including an RFID tag, attached to a box containing a plurality of individual products, to store an environmental history of a distribution, a barcode recorder to provide, to each of the plurality of individual products, a barcode in which identification (ID) information of the RFID tag is recorded, and a barcode reader to recognize the barcode attached to each of the plurality of individual products, and to output the environmental history of the distribution, corresponding to the ID information of the RFID tag that is received in response to a query with respect to the RFID tag, using the recognized barcode.

According to another aspect of the present invention, there is provided a total history management method using an RFID tag and a barcode, the method including providing, by a barcode recorder, a barcode to each of a plurality of individual products, by recording ID information of an RFID tag in the barcode, storing, through the RFID tag, an environmental history of a distribution, the RFID tag being attached to a box containing the plurality of individual products, and recognizing, by a barcode reader, the barcode attached to each of the plurality of individual products, and outputting the environmental history of the distribution corresponding to the ID information of the RFID tag that is received in response to a query with respect to the RFID tag using the recognized barcode.

EFFECT OF THE INVENTION

According to an embodiment of the present invention, when a barcode is provided by incorporating identification (ID) information of a radio frequency identification (RFID) tag into the barcode, environmental information, for example, a change in temperature during a distribution, and history information of an individual product may be provided using a low-cost barcode scheme, without attaching the RFID tag to the individual product. Here, the environmental information and the history information of the individual product may be unavailable in the original unprocessed barcode.

According to an embodiment of the present invention, in history management of a frozen product, for example fresh food, of which freshness may be changed depending on temperature, a change in temperature for each individual product may be verified during a distribution, without attaching a high-cost sensor tag to each individual product.

According to an embodiment of the present invention, use of RFID information may be expanded to an individual product, whereby distribution route information of the individual product which may be delivered by a parcel service and the like may be verified.

According to an embodiment of the present invention, information may be utilized at a level corresponding to RFID information, by employing a low-cost barcode technology in various applications, without attaching an RFID tag to an individual product.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to an embodiment of the present invention, a manager may attach a radio frequency identification (RFID) tag to a box containing a plurality of individual products. A total history management system may recode identification (ID) information of the RFID tag in a high capacity barcode of an individual product, and may use the high capacity barcode, at a low cost, to provide a history management function, that may be provided by the RFID tag during a distribution, by reading only ID information of the individual product. The total history management system may use a function of the RFID tag and the high capacity barcode operating conjunctively to provide the product history management function to the high capacity barcode at a low cost. In addition, when a sensing function is added to the RFID tag, the total history management system may store an environmental history of an individual product in distribution, and may provide the stored information when the information is requested.

Figure 4:
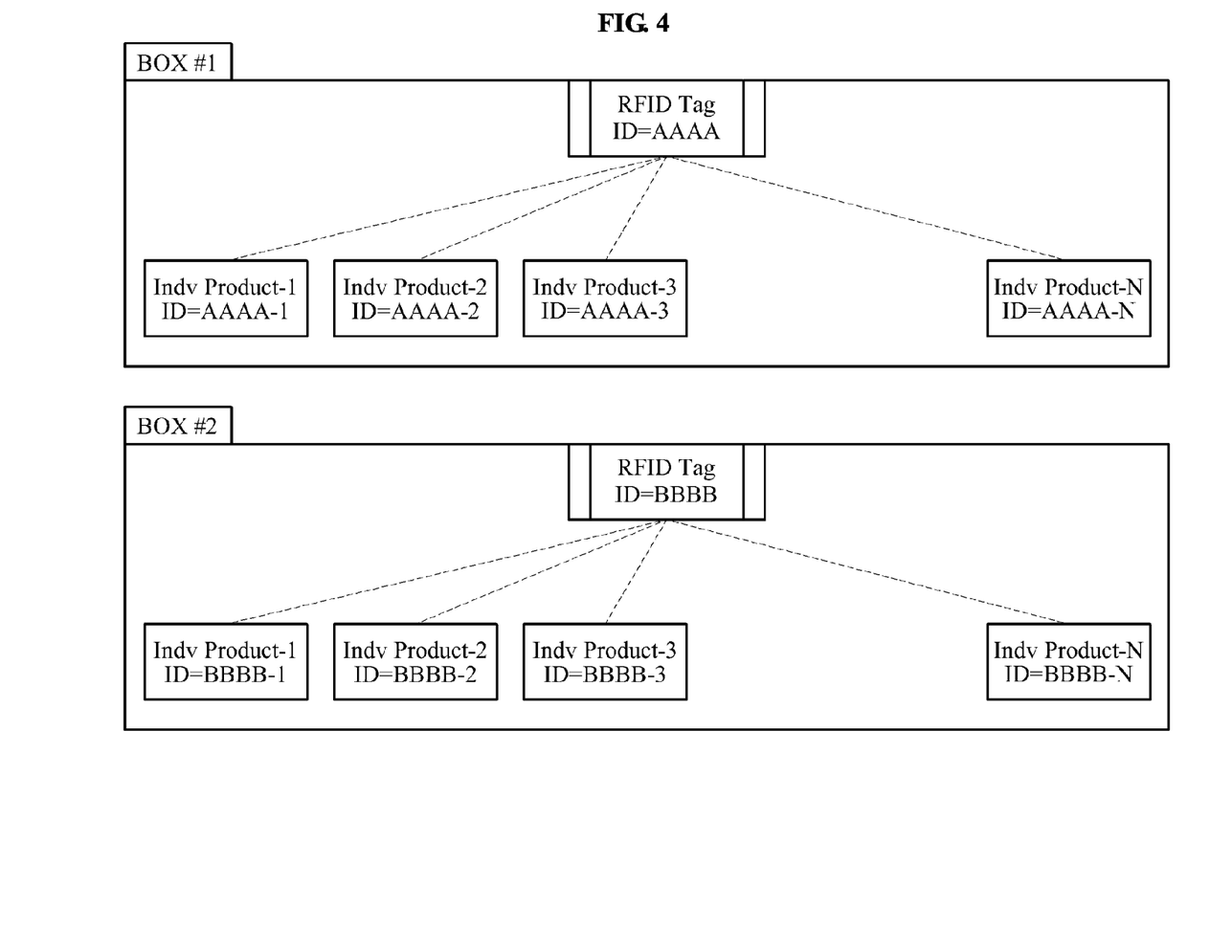
FIG. 4 is a diagram illustrating a mapping structure of a barcode and an RFID tag according to an embodiment of the present invention.

FIG. 4 is a diagram illustrating a mapping structure of a barcode and an RFID tag according to an embodiment of the present invention.

When a product enters a transportation process from a producing process, a manager may attach RFID tags to boxes, each containing a plurality of individual products, during a distribution. When a sensor is included in each of the RFID tags, the manager may attach each RFID tag to an internal side of a corresponding box in order to match environmental information of an individual product and environmental information of the RFID tag. A high capacity barcode may be attached to each individual product to be included in the box. In this instance, a value of the barcode may include ID information of the RFID tag.

As shown in FIG. 4, RFID tags having different ID values may be attached to boxes, respectively. High capacity barcodes, each having a unique ID value and including ID information of a corresponding RFID tag, may be attached to the products included in a corresponding box. The products may be transported in box units, and stored in a warehouse, during the distribution. Finally, each individual product may be delivered to a final customer through a store. The final customer may verify a distribution and environmental history of a corresponding RFID tag, by performing an ID inquiry of the individual product when purchasing the individual product, and may consume the corresponding product without anxiety. In particular, in a history management of a frozen product, for example fresh food, of which freshness may be changed depending on temperature, a change in temperature for each individual product may be verified using such a high capacity barcode during a distribution, without attaching a high-cost sensor tag to each individual product. Since a responsibility for damage to a product caused during a distribution may be clarified through a function to provide an environmental history of a distribution, the function may have advantages in distribution of food that is sensitive to an environmental change.

Figure 5:
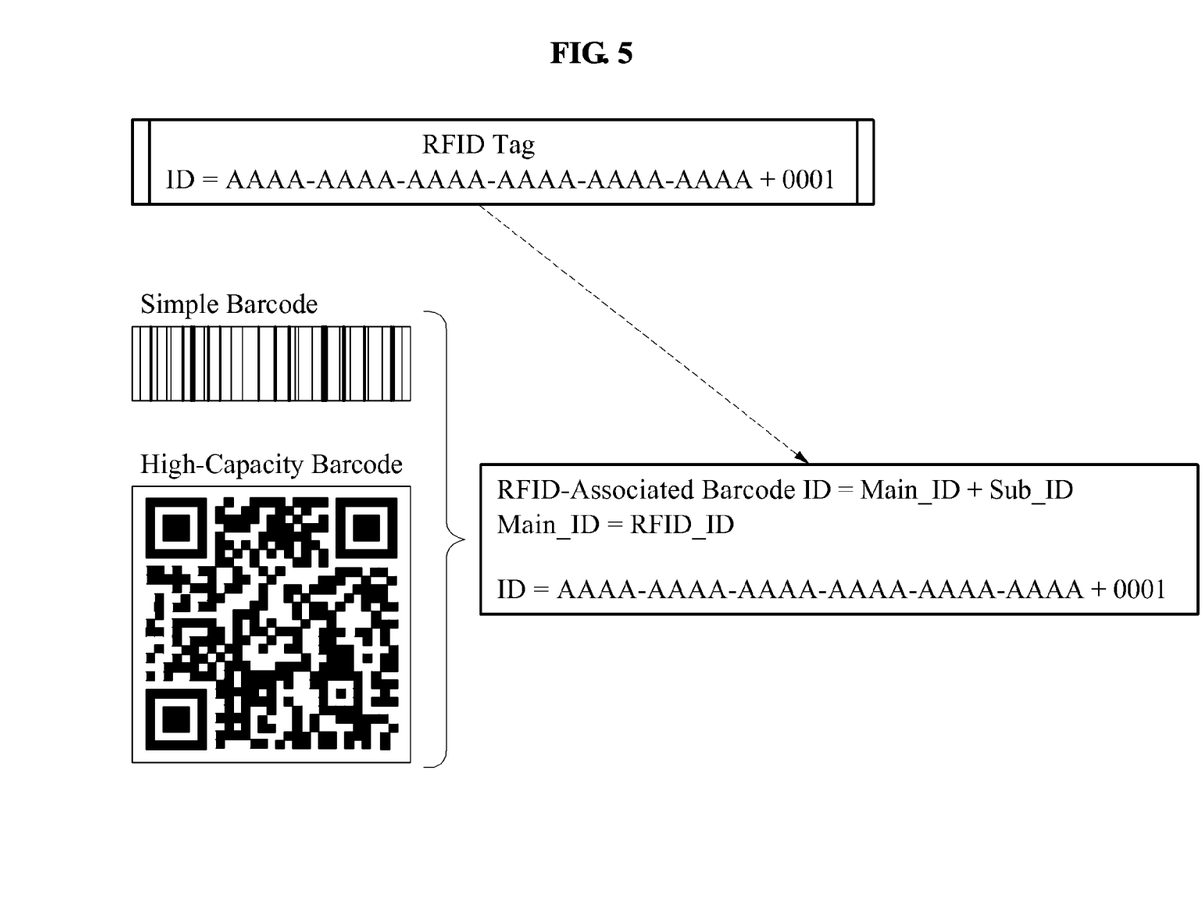
FIG. 5 is a diagram illustrating a configuration of identification (ID) information of a barcode to be used for classifying individual products according to an embodiment of the present invention.

FIG. 5 is a diagram illustrating a configuration of ID information of a barcode to be used for classifying individual products according to an embodiment of the present invention.

That is, FIG. 5 illustrates a mapping relationship between an ID of an RFID tag and an ID of a high capacity barcode, in a method of utilizing the RFID tag and the barcode conjunctively. The barcode may need to support a high capacity so that the ID information of the RFID tag may be included in the barcode, and may need to include separate information to be used for classify individual products. In this instance, the foregoing functions may be supported by configuring the ID of the high capacity barcode using a combination of a Main_ID and a Sub_ID. The Main_ID may have a value identical to a value of the ID of the RFID tag which may be attached to a box during a distribution of box units, and the Sub_ID may provide information to be used for classifying a plurality of individual products contained in the box.

Figure 6:
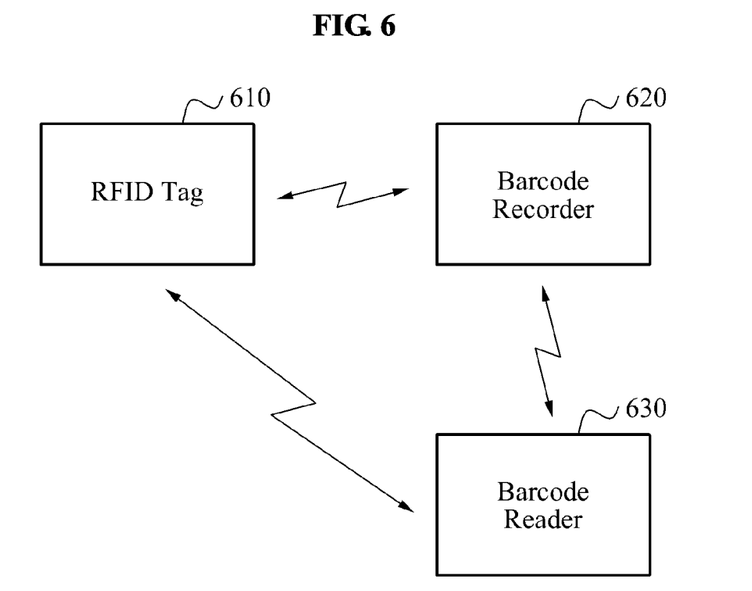
FIG. 6 is a block diagram illustrating a configuration of a total history management system using an RFID tag and a barcode according to an embodiment of the present invention.

FIG. 6 is a block diagram illustrating a configuration of a total history management system using an RFID tag and a barcode according to an embodiment of the present invention.

Referring to FIG. 6, the total history management system may include an RFID tag 610 to store an environmental history, a barcode recorder 620 to provide, to each individual product, a barcode in which ID information of the RFID tag 610 is recorded, and a barcode reader 630 to recognize the barcode attached to each individual product, and to output a corresponding environmental history.

A manager may attach the RFID tag 610 to a box containing a plurality of individual products. The RFID tag 610, attached to the box containing the plurality of individual products, may store an environmental history that may be changed during a distribution. The RFID tag 610 may be attached to a box containing identical types of individual products to store an environmental history.

The RFID tag 610 may have a sensing function to sense a state of a peripheral environment, and may store the environmental history of the distribution that may be sensed by performing the sensing function. The RFID tag 610 may store the environmental history by sensing temperature, humidity, and the like, through the sensing function that may be activated at every predetermined interval.

As an example, the RFID tag 610 may be attached to an internal side of the box to recognize an environment in which the plurality of individual products is exposed to an external environment during the distribution by sensing the box being opened, and to store the recognized environment. That is, the RFID tag 610 may be attached to the internal side of the box containing the plurality of individual products to store the environment in which the plurality of individual products is exposed, and to store an environmental change by recognizing the environment in which the plurality of individual product is exposed to the external environment since the box is opened.

The barcode recorder 620 may record ID information of the RFID tag 610 in a barcode, and may provide the barcode to each of the plurality of individual products. That is, the barcode recorder 620 may generate a barcode including the ID information of the RFID tag 610, and may provide the barcode to be attached to each of the plurality of individual products.

The barcode recorder 620 may generate the barcode using a quick response (QR) code provided in a two-dimensional form. The barcode recorder 620 may use the QR code to provide, to each of the plurality of individual products, a high capacity barcode having a great capacity for recording information.

The barcode recorder 620 may generate the barcode in which ID information of the RFID tag 610 that represents the plurality of individual products, and ID information to be used to classify the plurality of individual products. The barcode recorder 620 may incorporate the ID information of the RFID tag 610 and the ID information to be used to classify the plurality of individual products, and may provide an environmental history stored in the RFID tag 610 with respect to the plurality of individual products.

The barcode reader 630 may recognize the barcode attached to each of the plurality of individual products, and may output the environmental history of the distribution, corresponding to the ID information of the RFID tag 610 that is received in response to a query with respect to the RFID tag 610, using the recognized barcode. That is, the barcode reader 630 may recognize the ID information of the RFID tag 610 included in the barcode, and may output the environmental history of the distribution of the plurality of individual products, by querying the RFID tag 610.

Figure 7:
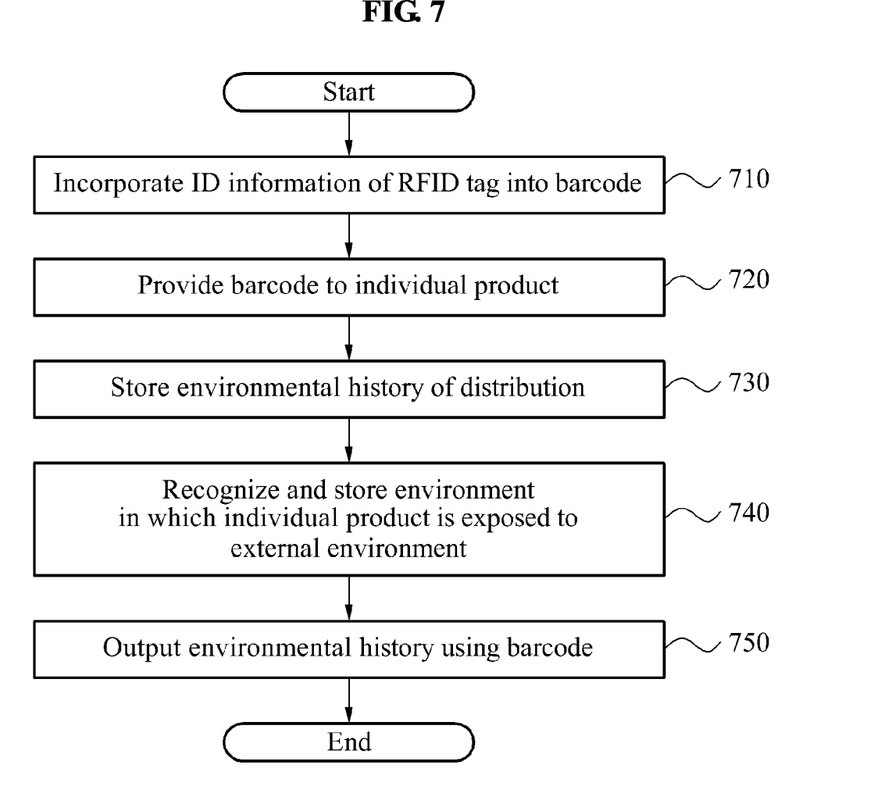
FIG. 7 is a flowchart illustrating a total history management method using an RFID tag and a barcode according to an embodiment of the present invention.

FIG. 7 is a flowchart illustrating a total history management method using an RFID tag and a barcode according to an embodiment of the present invention.

The total history management method may be performed by the total history management system of FIG. 6. Hereinafter, the following description will be provided with reference to FIGS. 6 and 7, for ease of description.

In operation 710, the barcode recorder 620 may configure a barcode to be a QR code provided in a two-dimensional form, and may use the QR code as a high capacity barcode which may include ID information of the RFID tag 610. The barcode recorder 620 may incorporate, into the barcode, the ID information of the RFID tag 610 that represents a plurality of individual products, and ID information to be used to classify the plurality of individual products.

In operation 720, the barcode recorder 620 may provide, to each of the plurality of individual products, the barcode including the ID information of the RFID tag 610 and the ID information to be used to classify the plurality of individual products. The barcode recorder 620 may provide the barcode to each of the plurality of individual products, and may provide the RFID tag 610 corresponding to the barcode to a box containing the plurality of individual products.

In operation 730, the RFID tag 610 may be attached to the box containing the plurality of individual products to store an environmental history of a distribution. The RFID tag 610 may have a sensing function to sense a state of a peripheral environment, for example, temperature, humidity, and the like, and may store the environmental history of the distribution that may be sensed by performing the sensing function.

In operation 740, the RFID tag 610 may be attached to an internal side of the box to recognize an environment in which the plurality of individual products is exposed to an external environment during the distribution by sensing the box being opened, and to store the recognized environment.

In operation 750, the barcode reader 630 may recognize the barcode attached to each of the plurality of individual products, and may output the environmental history of the distribution corresponding to the ID information of the RFID tag 610 that is received in response to a query with respect to the RFID tag 610, using the recognized barcode.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A total history management system using a radio frequency identification (RFID) tag and a barcode, the system comprising:
    an RFID tag, attached to a box containing a plurality of individual products, to store an environmental history of a distribution;
    a barcode recorder to provide, to each of the plurality of individual products, a barcode in which identification (ID) information of the RFID tag is recorded; and
    a barcode reader to recognize the barcode attached to each of the plurality of individual products, and to output the environmental history of the distribution, corresponding to the ID information of the RFID tag that is received in response to a query with respect to the RFID tag, using the recognized barcode, wherein
    the RFID tag is attached to an internal side of the box to sense the box being opened, to recognize an environment in which the plurality of individual products is exposed to an external environment during the distribution, and to store the recognized environment, which is the environmental history of the distribution.

2. The system of claim 1, wherein the RFID tag has a sensing function to sense a state of a peripheral environment, and stores the environmental history of the distribution that is sensed by performing the sensing function.

3. The system of claim 1, wherein the barcode comprises a quick response (QR) code provided in a two-dimensional form.

4. The system of claim 1, wherein the barcode comprises ID information of an RFID tag representing the plurality of individual products, and ID information to be used to classify the plurality of individual products.

5. A total history management method using a radio frequency identification (RFID) tag and a barcode, the method comprising:
    providing, by a barcode recorder, a barcode to each of a plurality of individual products, by recording identification (ID) information of an RFID tag in the barcode;
    storing, through the RFID tag, an environmental history of a distribution, the RFID tag being attached to a box containing the plurality of individual products;
    recognizing, by a barcode reader, the barcode attached to each of the plurality of individual products, and outputting the environmental history of the distribution, corresponding to the ID information of the RFID tag that is received in response to a query with respect to the RFID tag, using the recognized barcode;
    sensing the box being opened, through the RFID tag attached to an internal side of the box, and
    recognizing an environment in which the plurality of individual products is exposed to an external environment during the distribution, and storing the recognized environment, which is the environmental history of the distribution.

6. The method of claim 5, further comprising:
  storing, through the RFID tag, the environmental history of the distribution that is sensed by performing a sensing function to sense a state of a peripheral environment.

7. The method of claim 5, further comprising:
  forming the barcode to be a quick response (QR) code provided in a two-dimensional form.

8. The method of claim 5, further comprising:
  incorporating, into the barcode, ID information of an RFID tag representing the plurality of individual products, and ID information to be used to classify the plurality of individual products.

* * * * *